United States Patent
Hidaka

(10) Patent No.: US 7,848,401 B2
(45) Date of Patent: Dec. 7, 2010

(54) METHOD AND SYSTEM FOR STATIC DATA-PATTERN COMPENSATED ADAPTIVE EQUALIZER CONTROL

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 11/862,838

(22) Filed: Sep. 27, 2007

(65) Prior Publication Data

US 2009/0086810 A1    Apr. 2, 2009

(51) Int. Cl.
*H03H 7/30* (2006.01)
*H03H 7/40* (2006.01)
*H03K 5/159* (2006.01)

(52) U.S. Cl. ............... 375/229; 375/232; 375/343; 375/346; 375/350

(58) Field of Classification Search ......... 375/229–236, 375/346–350, 343
See application file for complete search history.

(56) References Cited

U.S. PATENT DOCUMENTS

2006/0259263 A1* 11/2006 Ashley et al. ............... 702/107

* cited by examiner

*Primary Examiner*—Curtis B Odom
(74) *Attorney, Agent, or Firm*—Baker Botts L.L.P.

(57) ABSTRACT

In accordance with a particular embodiment of the present invention, a method is offered that includes characterizing a data correlation matrix for an idle pattern offline in a filter environment and, further, using a static adaptive control scheme with a static value of a data-pattern compensation matrix to achieve a compensated adaptive equalizer control. In more specific embodiments, the adaptive control scheme is used with a ZF adaptation scheme in conjunction with a constant adaptation matrix. In other embodiments, the adaptive control scheme is used with a fast steepest-descent method using a variable adaptation matrix. In still other embodiments, the adaptive control scheme is used with a constant adaptation matrix, whereby a value of is statically calculated. If the adaptive control scheme is used with a decoupling matrix, a value of is statically calculated. An inverter is used between the data correlation matrix and the data-pattern compensation matrix.

23 Claims, 4 Drawing Sheets

METHOD AND SYSTEM FOR STATIC DATA-PATTERN COMPENSATED ADAPTIVE EQUALIZER CONTROL

RELATED APPLICATIONS

This application is related to U.S. patent application Ser. No. 11/862,799, entitled "METHOD AND SYSTEM FOR PROVIDING FAST AND ACCURATE ADAPTIVE CONTROL METHODS," and U.S. patent application Ser. No. 11/862,823, entitled "METHOD AND SYSTEM FOR ON-LINE DATA-PATTERN COMPENSATED ADAPTIVE EQUALIZER CONTROL," both filed concurrently with the present application.

TECHNICAL FIELD OF THE INVENTION

This invention relates generally to the field of data communications and, more specifically, to a system for static data-pattern compensated adaptive equalizer control.

BACKGROUND OF THE INVENTION

An equalization (EQ) filter is a filter, usually adjustable, typically meant to compensate for the unequal frequency response of some other signal processing circuit or system. Such filters usually allow the user to adjust one or more parameters that determine the overall shape of the filter's transfer function. Equalizers may be designed with peaking filters, shelving filters, or high-pass and low-pass filters.

In a digital transmission system, an equalizer is often used to compensate for inter-symbol interference due to frequency-dependent loss such as skin effect and dielectric loss. An adaptive equalizer that automatically adjusts equalizer parameters to the current channel characteristics is generally desired. This is because the channel characteristics are typically unknown a priori. As with all such processing operations, of critical importance are issues relating to speed, accuracy, and automation.

SUMMARY OF THE INVENTION

The present invention provides a method and a system for providing continuous adaptive control using static data-pattern compensation that substantially eliminates or reduces at least some of the disadvantages and problems associated with previous optimization methods and systems.

In accordance with a particular embodiment of the present invention, a method is offered that includes characterizing a data correlation matrix for an idle pattern offline in a filter environment and, further, using a static adaptive control scheme with a static value of a data-pattern compensation matrix to achieve a compensated adaptive equalizer control. In more specific embodiments, the adaptive control scheme is used with a ZF adaptation scheme in conjunction with a constant adaptation matrix. In other embodiments, the adaptive control scheme is used with a fast steepest-descent method using a variable adaptation matrix. In still other embodiments, the adaptive control scheme is used with a constant adaptation matrix, whereby a value of is statically calculated. If the adaptive control scheme is used with a decoupling matrix, a value of is statically calculated. An inverter is used between the data correlation matrix and the data-pattern compensation matrix. Typically, the method employs a compensated error correlation vector and an uncompensated error correlation vector that interface with each other.

Technical advantages of particular embodiments of the present invention offer benefits from use of a continuous adaptive control using a static data-pattern compensation. Such an architecture is applicable for existing standard interface without changes of encoding or protocol. In addition, it minimizes the square error for uncorrelated data sequence using the idle sequence, which may be correlated.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
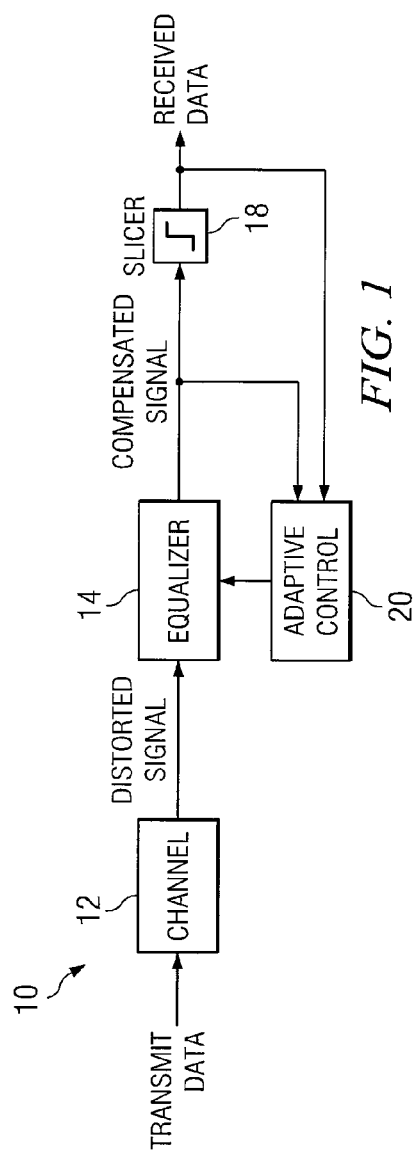
FIG. 1 is a simplified diagram illustrating a digital transmission system with an adaptive equalizer related to one embodiment of the present invention.

FIG. 1 is a simplified diagram illustrating a digital transmission system with an adaptive equalizer 10 related to one embodiment of the present invention. FIG. 1 includes a channel 12, an equalizer 14, a slicer 18, and an adaptive control 20.

A prior scheme of the adaptive equalizer control is the general Zero-Forcing (ZF) algorithm. Filter output y(k) is a linear weighted sum of tap outputs of the filter bank. Differences between the recovered data d(k) and the filter output y(k) yields an error signal e(k). Correlation between the error signal e(k) and the recovered data d(k) [with some delays] forms error correlation vector $\{e_j(k)\}^T$. The error correlation vector is multiplied with an adaptation matrix M and a loop constant μ, then it is integrated to generate the tap weights $\{W_i\}^T$.

Figure 2:
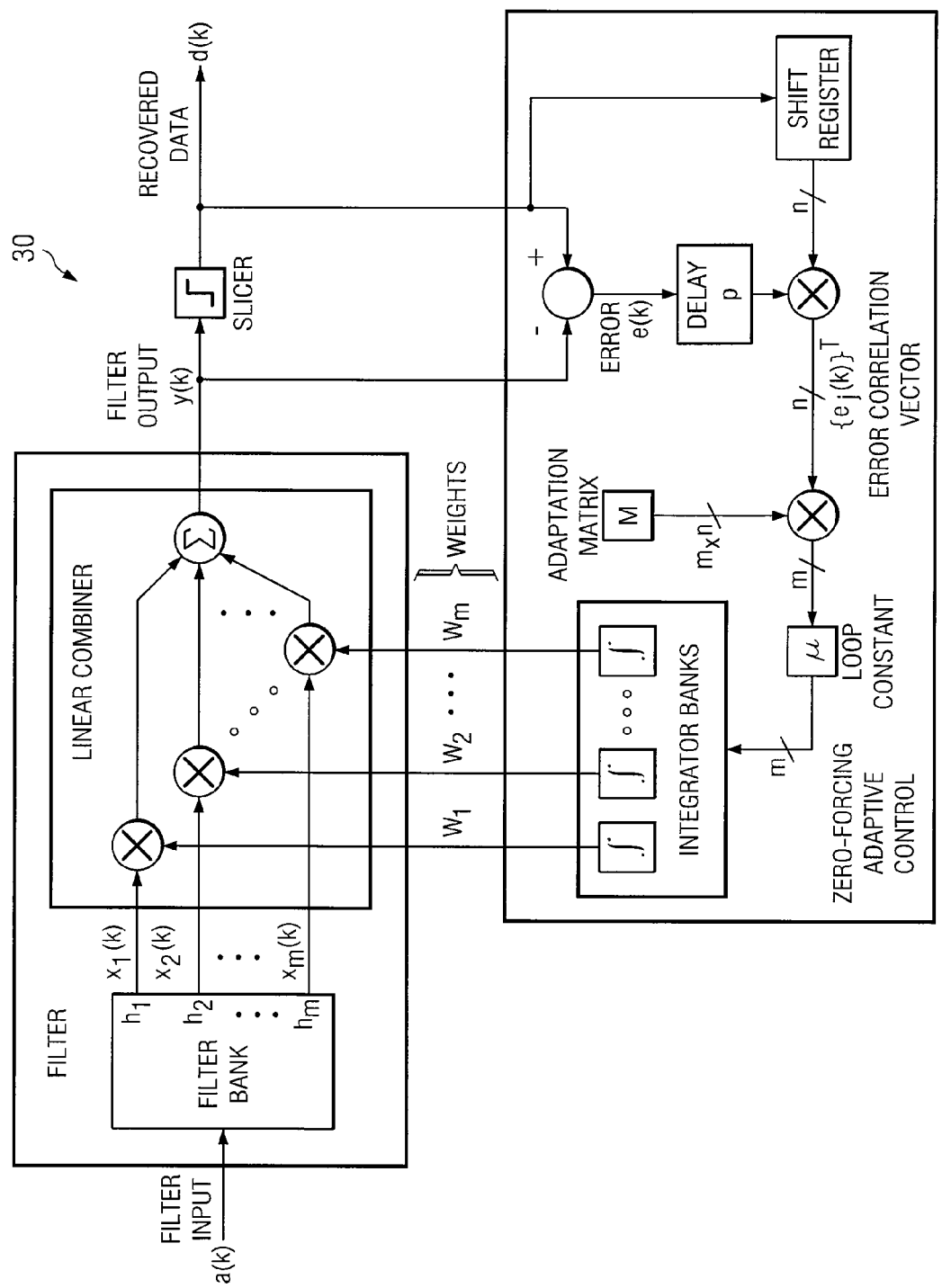
FIG. 2 is a simplified block diagram illustrating an adaptive equalizer using a Zero-Forcing (ZF) algorithm.

FIG. 2 is a simplified block diagram illustrating an adaptive equalizer 30 using the Zero-Forcing algorithm.

The general ZF algorithm can be defined, as follows:

$$y(k) = \sum_{i=1}^{m} w_i \cdot x_i(k) \quad \text{EQ 1}$$

$$e(k) = d(k) - y(k) \quad \text{EQ 2}$$

$$= d(k) - \sum_{i=1}^{m} w_i \cdot x_i(k)$$

$$e_j(k) = e(k-p) \cdot d(k-j+1) \quad \text{EQ 3}$$

$$x_i(k) = \sum_{s=-\infty}^{+\infty} h_i(s) \cdot d(k-s) \approx \sum_{s=-p}^{n-p-1} h_i(s) \cdot d(k-s) \quad \text{EQ 4}$$

-continued $$e(k) = d(k) - \sum_{i=1}^{m} w_i \cdot \sum_{s=-\infty}^{+\infty} h_i(s) \cdot d(k-s) \quad \text{EQ 5}$$

$$\approx d(k) - \sum_{i=1}^{m} w_i \cdot \sum_{s=-p}^{n-p-1} h_i(s) \cdot d(k-s)$$

$$M = \begin{pmatrix} h_1(-p) & h_1(1-p) & \cdots & h_1(n-p-1) \\ h_2(-p) & h_2(1-p) & \cdots & h_2(n-p-1) \\ \vdots & \vdots & \ddots & \vdots \\ h_m(-p) & h_m(1-p) & \cdots & h_m(n-p-1) \end{pmatrix} \quad \text{EQ 6}$$

$$w^{(c+1)} = w^{(c)} + \mu M \{e_j(k)\}^T \quad \text{EQ 7}$$

$$w_k^{(c+1)} = w_i^{(c)} + \mu \sum_{j=1}^{n} h_i(-p+j-1) \cdot e_j(k) \quad \text{EQ 8}$$

Definition of variables:
  y(k) sequence of filter output at index k
  m number of taps of the filter bank output
  $w_i$ weight parameter for the i-th tap of the filter bank output
  $x_i(k)$ sequence of the i-th tap of the filter bank output at index k
  e(k) sequence of filter output error at index k
  d(k) sequence of transmit data (and recovered data if there is no data error) at index k
  $e_j(k)$ correlation between e(k−p) and d(k−j+1) at index k
  p length of pre-cursor inter-symbol interference (ISI)
  n length of whole span of pre- and post-cursor ISI including center tap
  $h_i(s)$ discrete-time impulse response of the i-th tap of the filter bank output
  M adaptation matrix
  $w_i^{(e)}$ weight parameter for the i-th tap of the filter bank output at iteration c
  $w^{(e)}$ weight parameter vector $w=\{w_i\}^T$ for the filter at iteration c
  μ loop constant One problem with the general ZF algorithm is that the transmit data must be uncorrelated. Mathematically, this can be shown by Equation 9:

$$E[d(k) \cdot d(l)] = \begin{cases} 0 & (k \neq l) \\ 1 & (k = l). \end{cases} \quad \text{EQ 9}$$

In general, this requirement is not satisfied because the original application data to be transmitted may be highly correlated. In prior systems, two ways have been used to satisfy this requirement.

Figure 3:
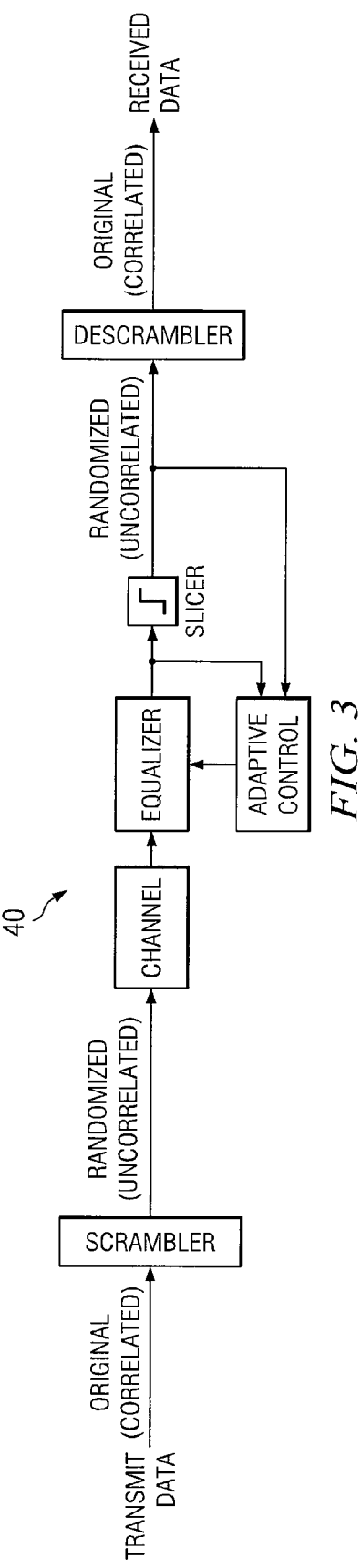
FIG. 3 is a simplified block diagram illustrating an adaptive equalizer control with scrambler and descrambler.

FIG. 3 is a simplified block diagram illustrating an adaptive equalizer control 40 with scrambler and descrambler. One way to avoid the issue outlined above is to use a scrambler and a descrambler. Before transmission, the scrambler randomizes the original data sequence into randomized sequence, and after transmission of the randomized sequence, the descrambler decodes the randomized sequence back to the original data sequence.

Figure 4:
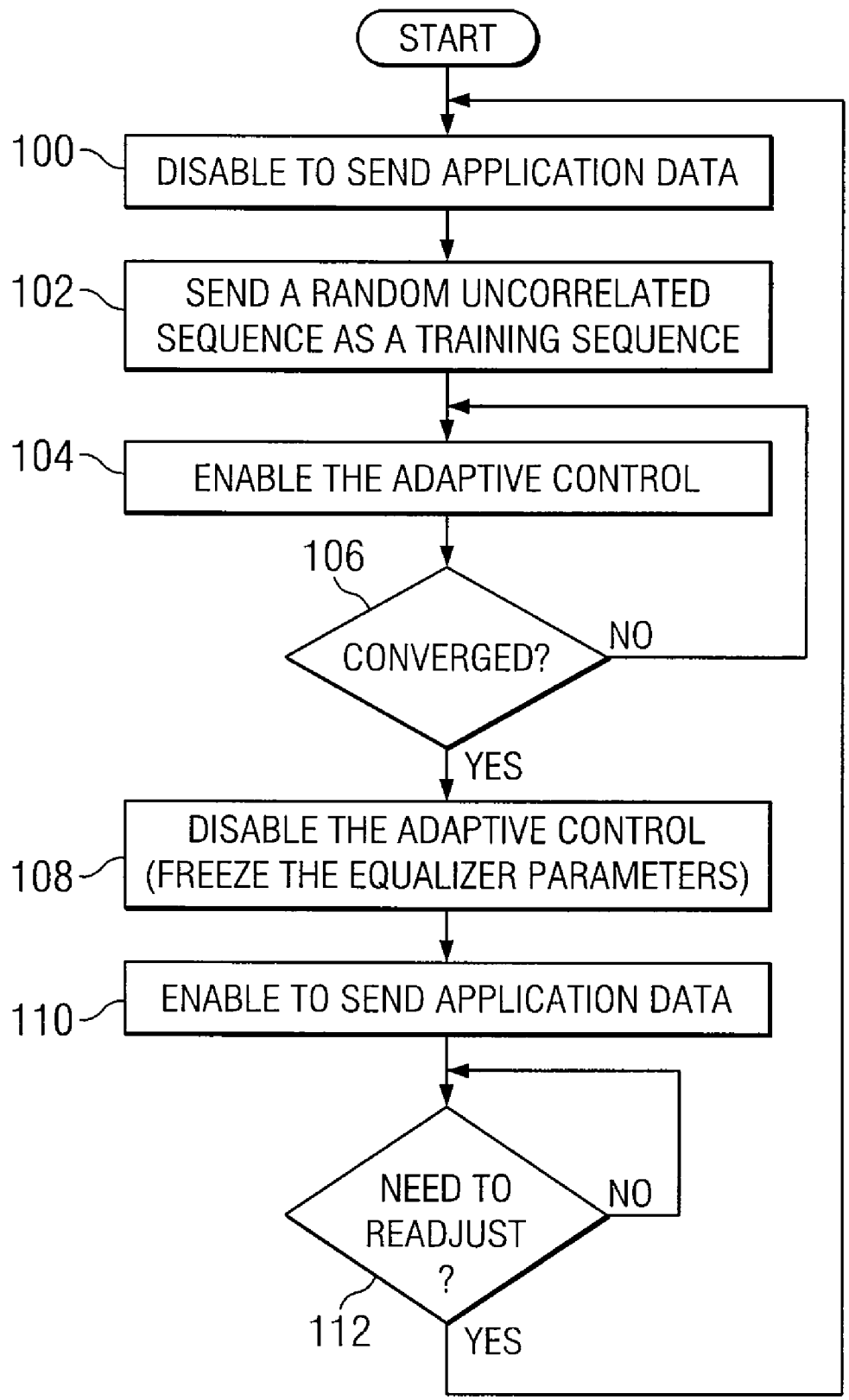
FIG. 4 is a simplified flowchart illustrating a control flow to force a random sequence during the adaptive control.

FIG. 4 is a simplified block diagram illustrating a control flow to force a random sequence during the adaptive control. As evidenced by FIG. 4, another way to address the issue identified above is to use a random uncorrelated sequence as the training sequence and enable the adaptive control only in the training period. The adaptive control should be disabled while transmitting the application data because application data may be correlated.

The method outlined in FIG. 4 begins at step 100, where there is a command to prohibit the sending of application data. At step 102, a random uncorrelated sequence is sent as a training sequence. At step 104, the adaptive control is enabled. If there is convergence, then the flow moves to step 108 where the adaptive control is disabled. At step 110, application data can be sent once again. If there is no adjustment in step 112, the process ends. Where adjustments are necessary, the flow returns to the beginning of the process, as is illustrated.

Note that these two prior methods are not applicable to existing standard interfaces because we cannot change the encoding scheme or the protocol of existing standard. For such existing standard interfaces, we can enable the adaptive control only once in the start up period assuming that the transmitter is sending an idle sequence because the link is not up yet. However, if the idle sequence is correlated, the convergence point by the adaptive control will not be optimal. We cannot change the idle sequence to the desired random uncorrelated sequence because the idle sequence has been already defined as part of the existing standard.

Figure 5:
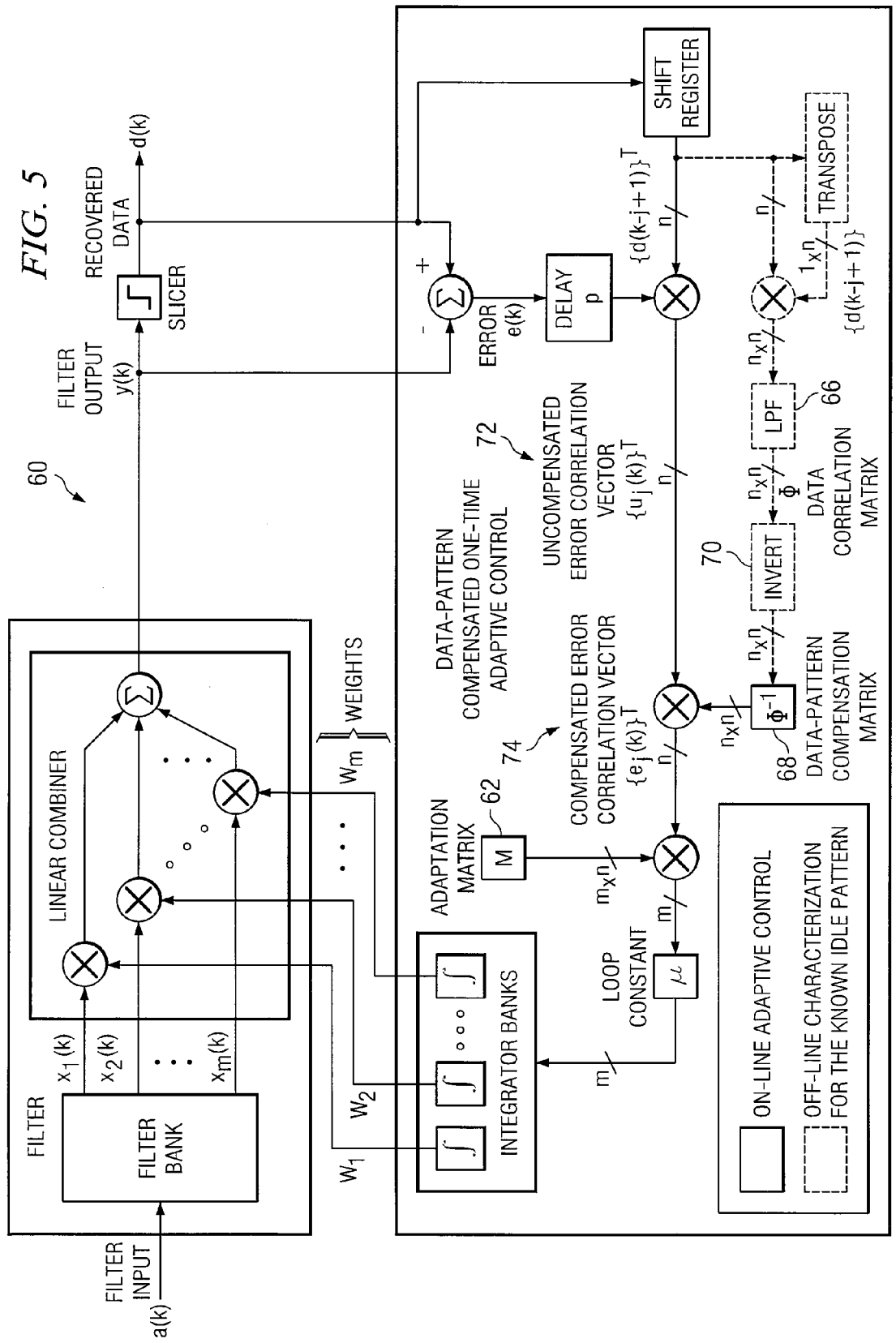
FIG. 5 is a simplified block diagram illustrating a static adaptive equalizer control using data-pattern compensation for idle pattern.

FIG. 5 is a simplified block diagram illustrating a static data-pattern adaptive equalizer control system 50. FIG. 5 includes an adaptation matrix 62, an uncompensated error correlation vector 72, a compensated error correlation vector 74, and an invert component 70. FIG. 5 also includes a data-pattern compensation matrix 68, a data correlation matrix, and a low-pass filter (LPF) 66.

One solution for problems presented in this environment is to characterize the data correlation matrix for the idle pattern offline and use static adaptive control scheme with the static value of the data-pattern compensation matrix as shown in FIG. 5. The adaptive control may be enabled only once in the start up period assuming that the transmitter is sending the idle pattern because the link is not up yet. Once the adaptive control is finished, the adaptive control may be disabled for the rest of period until the link is initialized again. Or, the adaptive control may be enabled whenever the idle pattern is being received. When data patterns other than the idle pattern are received, the adaptive control is disabled, and the weight parameters are kept at the last values. When the idle pattern is received again, the adaptive control may be enabled again. This scheme may be used with the general ZF adaptation scheme using a constant adaptation matrix M. It may be also used with the fast steepest-descent method using a variable adaptation matrix M. If it is used with a constant adaptation matrix M, the value of $M\Phi^{-1}$ may be statically calculated. If the decoupling matrix is used, the value of $(MM^T)^{-1}M\Phi^{-1}$ may be also statically calculated.

There is a multitude of advantages to using such an approach. For example, the control protocol is applicable for existing standard interface without changes of encoding or protocol. In addition, it minimizes the square error for uncorrelated data sequence using the idle sequence, which may be correlated.

It is critical to note that the components illustrated in FIG. 5 (or in many of the illustrated architectures outlined herein) may be implemented as digital circuits, analog circuits, software, or any suitable combination of these elements. In addition, any of these illustrated components may include software and/or an algorithm to effectuate their features and/or applications as described herein. Alternatively, such operations and techniques may be achieved by any suitable hardware, component, device, application specific integrated circuit (ASIC), additional software, field programmable gate array (FPGA), processor, erasable programmable ROM (EPROM), electrically erasable programmable ROM (EEPROM), or any other suitable object that is operable to facilitate such operations. Considerable flexibility is provided by the structure of these architectures in the context of this arrangement. Thus, it can be easily appreciated that such functions could be provided external to the outlined environment. In such cases, such a functionality could be readily embodied in a separate component, device, or module.

Although the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

What is claimed is:

1. A method, comprising:
   characterizing a data correlation matrix for an idle pattern offline in a filter environment;
   controlling an equalizer using a static adaptive control with a static value of a data-pattern compensation matrix to achieve a compensated adaptive equalizer control; and
   enabling the static adaptive control of the equalizer when the idle pattern is being received.

2. The method of claim 1, wherein the adaptive control is used with a ZF adaptation scheme in conjunction with a constant adaptation matrix.

3. The method of claim 1, wherein the filter environment comprises a linear combiner, a filter bank, a filter input, and recovered data.

4. The method of claim 1, wherein the adaptive control uses a fast steepest-descent method using a variable adaptation matrix.

5. The method of claim 1, wherein the adaptive control uses a constant adaptation matrix.

6. The method of claim 1, wherein the adaptive control uses a decoupling matrix.

7. The method of claim 1, wherein an inverter is used between the data correlation matrix and the data-pattern compensation matrix.

8. The method of claim 1, wherein the method employs a compensated error correlation vector and an uncompensated error correlation vector that interface with each other.

9. The method of claim 1, wherein a compensated error correlation vector is the same as the uncompensated error correlation vector for uncorrelated sequences.

10. The method of claim 1, wherein the static adaptive control is enabled only during a start-up period.

11. A non-transitory computer-readable medium embedded with logic and operable to:
    characterize a data correlation matrix for an idle pattern offline in a filter environment; and
    use a static adaptive control scheme with a static value of a data-pattern compensation matrix to achieve a compensated adaptive equalizer control; and
    enable the static adaptive control when the idle pattern is being received.

12. The non-transitory computer-readable medium of claim 11, wherein the adaptive control scheme is used with a ZF adaptation scheme in conjunction with a constant adaptation matrix.

13. The non-transitory computer-readable medium of claim 11, wherein the filter environment comprises a linear combiner, a filter bank, a filter input, and recovered data.

14. The non-transitory computer-readable medium of claim 11, wherein the adaptive control scheme is used with a fast steepest-descent method using a variable adaptation matrix.

15. The non-transitory computer-readable medium of claim 11, wherein the adaptive control scheme is used with a constant adaptation matrix.

16. The non-transitory computer-readable medium of claim 11, wherein the adaptive control scheme is used with a decoupling matrix.

17. The non-transitory computer-readable medium of claim 11, wherein an inverter is used between the data correlation matrix and the data-pattern compensation matrix, and wherein the method employs a compensated error correlation vector and an uncompensated error correlation vector that interface with each other.

18. A system, comprising:
    an equalizer; and
    an adaptive filter that includes a low-pass filter, wherein the adaptive filter is configured to:
      characterize a data correlation matrix for an idle pattern offline;
      implement a static adaptive control scheme with a static value of a data-pattern compensation matrix to control the equalizer; and
      enable the static adaptive control when the idle pattern is being received.

19. The system of claim 18, wherein the adaptive control scheme is used with a ZF adaptation scheme in conjunction with a constant adaptation matrix.

20. The system of claim 18, further comprising:
    a linear combiner, a filter bank, a filter input, and recovered data.

21. The system of claim 18, wherein the adaptive control scheme is used with a fast steepest-descent method using a variable adaptation matrix.

22. The system of claim 18, further comprising:
    an inverter, which is positioned between the data correlation matrix and the data-pattern compensation matrix.

23. The system of claim 18, further comprising:
    a compensated error correlation vector and an uncompensated error correlation vector that interface with each other.

* * * * *